United States Patent [19]
Herndon et al.

[11] Patent Number: 5,648,887
[45] Date of Patent: Jul. 15, 1997

[54] ELECTRIC CURRENT LIMITING DEVICE FOR WINCH RESPONSIVE TO MULTIPLE DEVICE STATES

[75] Inventors: Richard S. Herndon, Albany; Jeffrey E. Paulson, Portland; Robert C. Proebstel, Albany, all of Oreg.

[73] Assignee: Warn Industries, Inc., Milwaukie, Oreg.

[21] Appl. No.: 257,654

[22] Filed: Jun. 9, 1994

[51] Int. Cl.$^6$ ........................................ H02H 7/08
[52] U.S. Cl. ................... 361/31; 361/93; 361/97
[58] Field of Search .................... 361/18, 20, 21, 361/23–24, 28, 29, 30, 31, 33, 54, 56, 57, 93, 94, 97; 254/271, 276, 362; 318/254, 430, 431

[56] References Cited

U.S. PATENT DOCUMENTS

| | | | |
|---|---|---|---|
| 3,965,407 | 6/1976 | Stoner | 318/432 |
| 4,260,938 | 4/1981 | Joyes | 318/434 |
| 4,517,506 | 5/1985 | Heinrich | 318/807 |
| 4,532,571 | 7/1985 | Satou | 361/31 |
| 4,713,720 | 12/1987 | Rogers et al. | 361/97 |
| 4,854,547 | 8/1989 | Oliphant | 254/271 |
| 4,873,474 | 10/1989 | Johnson | 318/434 |
| 4,905,117 | 2/1990 | Beg | 361/93 |
| 4,956,590 | 9/1990 | Phillips | 318/432 |
| 4,987,358 | 1/1991 | Branam | 318/603 |
| 5,214,359 | 5/1993 | Herndon et al. | 361/31 |
| 5,436,579 | 7/1995 | Tran | 326/98 |
| 5,448,442 | 9/1995 | Farag | 361/24 |

FOREIGN PATENT DOCUMENTS

| | | |
|---|---|---|
| 54-153248 | 12/1979 | Japan. |
| 56-12890 | 7/1981 | Japan. |

*Primary Examiner*—Jeffrey A. Gaffin
*Assistant Examiner*—Ronald W. Leja
*Attorney, Agent, or Firm*—Klarquist Sparkman Campbell Leigh & Whinston, LLP

[57] ABSTRACT

A winch system including an electric motor is protected against an overload condition by use of a current sense device and a current limiting device. The current limiting device employs multiple current thresholds to account for normal current usage by the motor during an initial current inrush period and during subsequent normal operation. The current limiting device also references battery voltage to establish current thresholds as a function thereof and thereby establish shutdown conditions corresponding to consistent motor load conditions. Overall, the current limiting device is responsive to multiple winch device states of operation and more fully protects the winch system against damage due to an overload condition.

22 Claims, 16 Drawing Sheets

ELECTRIC CURRENT LIMITING DEVICE FOR WINCH RESPONSIVE TO MULTIPLE DEVICE STATES

BACKGROUND OF THE INVENTION

The present invention relates generally to a winch and associated control circuitry used to pull or lift heavy loads, and relates particularly to an electric current limiting device sensing a magnitude of current used by the winch and shutting down winch operation as a function of the magnitude of electric current drawn in conjunction with particular states of winch operation.

Winches support a wide range of applications and assume a variety of sizes and types. Winches typically have an upper load limit. Thus, a winch may be rated, for example, as a 10,000 pound winch indicating that load bearing components may withstand applied forces to a maximum 10,000 pound force.

A problem occurs when a winch is driven beyond its rating, i.e., placed under a load condition exceeding its rating. Without some form of shut-off mechanism, the weakest components of the winch can breakdown or deteriorate. Destructive failure is often the first indication that a load limit has been exceeded. Not only can this condition be costly in repair services and shutdown time, it also represents a safety hazard to those working with or in the vicinity of the winch. Even in cases where the components of the winch are designed to far exceed its load limit rating, damage may occur to supporting structures or to the item being pulled or lifted. The operator/user may simply want assurance that the load limit is not exceeded in any event. The subject matter of the present invention finds application in maintaining loads at or below a given rating.

Sensing the load condition on a given winch may be accomplished by sensing the magnitude of current delivered to the winch. U.S. Pat. No. 4,873,474, assigned in common to the assignee of the present invention, illustrates a winch with a shut-off load limiting device. Generally, the load limiting device of U.S. Pat. No. 4,873,474 senses a magnitude of current delivered to the winch and shuts off winch operation when a given magnitude is exceeded. While the load limiting device of U.S. Pat. No. 4,873,474 does allow adjustment in a threshold current used to trigger a winch shutdown, the device of U.S. Pat. No. 4,873,474 is advanced by the invention herein.

SUMMARY OF THE INVENTION

In accordance with the present invention, a load limiting device for a winch takes into account multiple states of winch operation in conjunction with the magnitude of current drawn by the winch to more appropriately determine whether a shutdown procedure need be invoked. Thus, different current thresholds may be referenced by recognizing certain states of winch operation and corresponding current drawn by the winch. The current limiting device allows an appropriate magnitude of current flow to the winch motor depending on the present state of winch operation. For example, during an initial "inrush" interval, a relatively high current magnitude threshold accommodates the onset of winch operation. During subsequent winch operation, however, a relatively lower current magnitude threshold maintains the winch within appropriate operating conditions.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention finds application in a winch assembly by serving as a shut-off device halting winch operation under certain conditions, i.e., under potentially damaging or hazardous conditions. As used herein, the term "winch" shall refer generally to any device employing a motor to move a load. Thus, a winch as used herein may refer to devices for lifting loads or pulling loads and need not be limited to any particular application.

Figure 1:
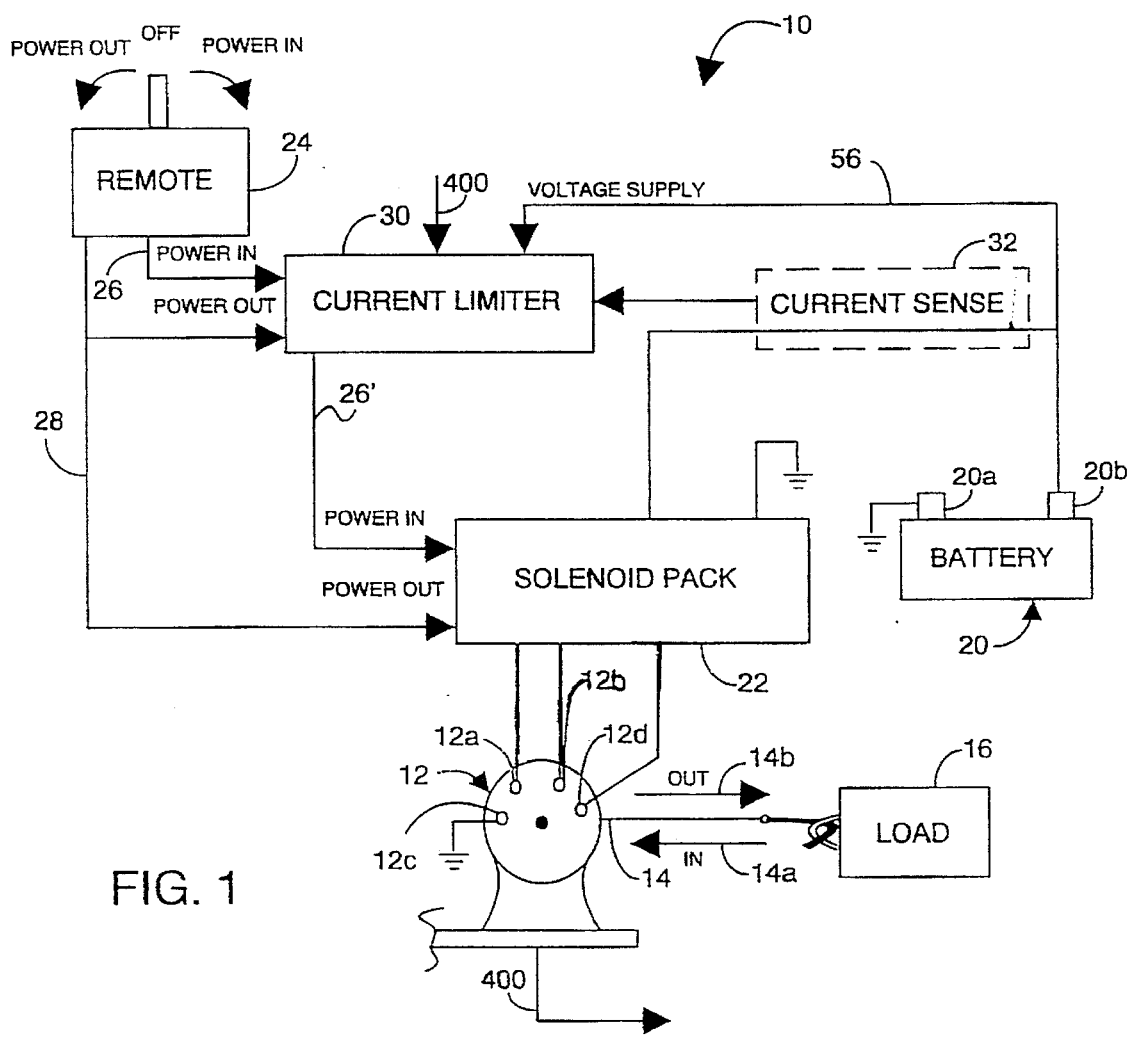
FIG. 1 is a block diagram of a winch assembly including a current limiting device in accordance with the present invention.

FIG. 1 illustrates a winch system 10 in accordance with the present invention. Winch system 10 includes an electric motor 12 with a spool (not shown) for deploying or collecting a cable 14 attached to a load 16. Control terminals 12a and 12b of motor 12 receive electrical energy and, depending on the relative potential therebetween, cause motor 12 to operate in one of two rotational directions. A third terminal 12c of motor 12 ties to ground potential. A fourth terminal 12d ties to the armature of motor 12. While a variety of electric motors may be monitored under the present invention, motor 12 as illustrated herein is a series wound electric motor. By manipulating the relative potential between terminals 12a and 12b, motor 12 may be driven into one of two rotational directions. More particularly, motor 12 may be operated in one mode to collect cable 14 by movement toward motor 12 in a direction 14a and another mode to deploy cable 14 outward in a direction 14b. As may be appreciated, movements of cable 14 in directions 14a and 14b are "powered" movements under the influence of motor 12.

Motor 12 receives electrical energy from a battery 20. To accomplish selected control over motor 12, however, electrical energy from battery 20 is routed through a solenoid pack 22. As may be appreciated, solenoid pack 22 may selectably provide no energy to motor 12, energy for powered operation in direction 14a, or energy for powered operation in direction 14b. Use of a solenoid pack 22 for this purpose is known in the art. Thus, terminal 20b of battery 20 is applied to solenoid pack 22, and solenoid pack 22 couples to the terminals 12a, 12b, and 12d of motor 12. Terminal 20a of battery 20 is tied to ground potential.

System 10 further includes a remote control station 24, e.g., a handheld control unit or a remote operator switch. Remote control station 24 operates in three modes, i.e., power out, off, and power in. Remote control station 24 provides as output a power in signal 26 and a power out signal 28. In the particular embodiment shown herein, the signals 26 and 28 carry a positive voltage when the associated function is to be invoked by solenoid pack 22, and otherwise carry zero potential. In the particular embodiment illustrated herein, motor 12 shutdown is invoked only with respect to the power in, i.e., collection of cable 14 in the direction 14a, mode of operation. Deploying cable 14, i.e., in the direction 14b, does not generally result in an overload condition for motor 12 and need not be monitored for an overload condition. Accordingly, the power out signal 28 is applied directly to solenoid pack 22, but the power in signal 26 is routed through a current limiter 30 and appears as a qualified power in signal 26' to solenoid pack 22.

A current sensing device 32 provides a measure of current taken from terminal 20b of battery 20 and applied to the solenoid pack 22. In operation, current limiter 30 allows direct application of the power out signal 28 to the solenoid pack 22, i.e., has no shutdown authority over a power out command. Under a detected shutdown condition during a power in command, however, current limiter 30 prevents application of the power in signal 26' to solenoid pack 22. Solenoid pack 22 is a conventional arrangement of solenoids responsive to signals of remote station 24, i.e., responsive to the power in signal 26' as provided by current limiter 30 and responsive to the power out signal 28 as provided directly by remote control station 24.

Thus, remote control station 24 generates the power in signal 26 and power out signal 28 to control solenoid pack 22, and thereby dictates normal operation of motor 12. Current limiter 30 intervenes, however, when necessary to shutdown operation of motor 12 during collection of cable 14 in the direction 14a as described more fully hereafter.

Figure 2A:
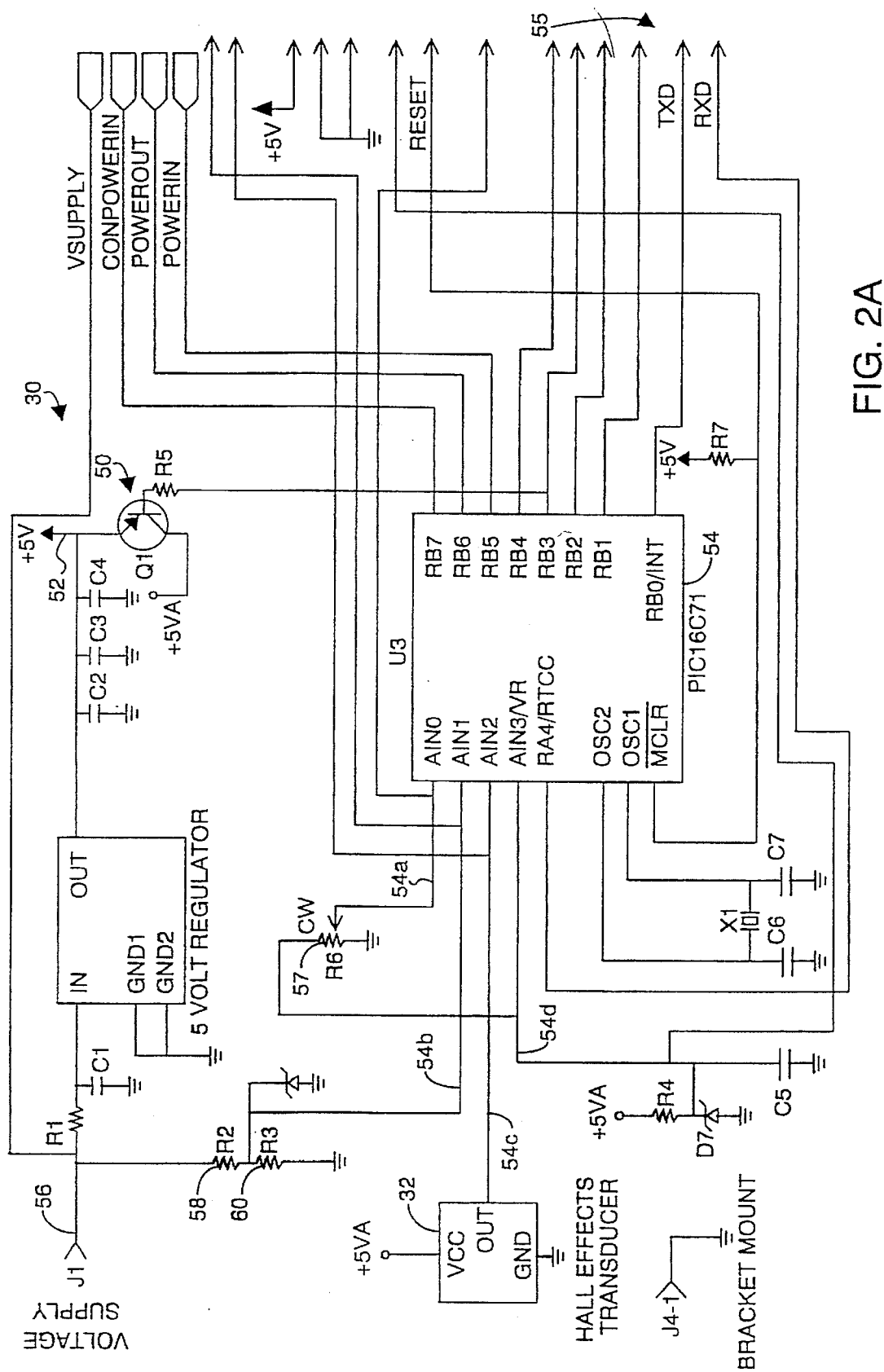
FIGS. 2A and 2B illustrate by schematic drawing a preferred embodiment of the current limiting device of FIG. 1.
Figure 2B:
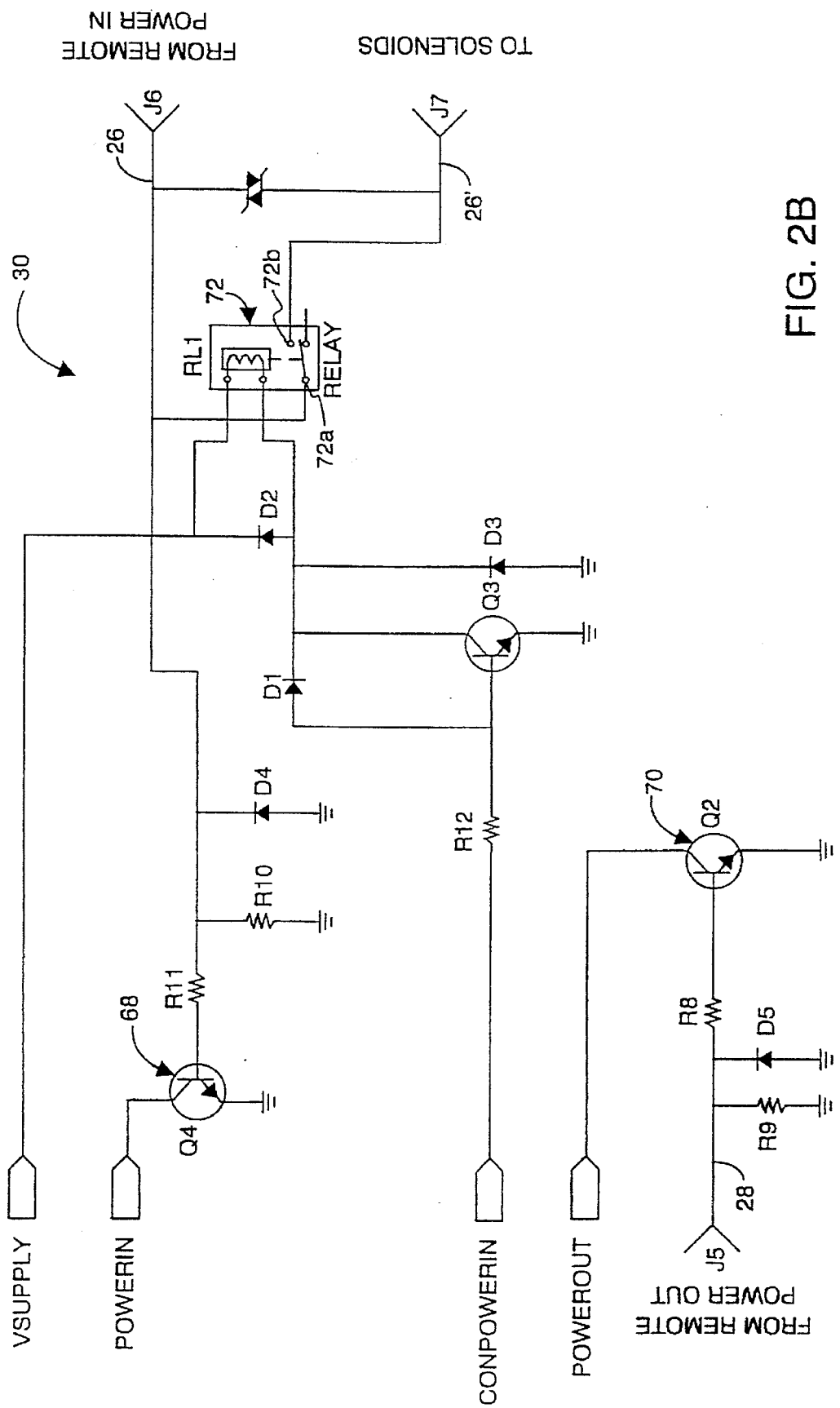

FIGS. 2A and 2B illustrate by schematic diagram the current limiter 30 of FIG. 1. Details of implementation and operation of the current limiter 30 will be apparent to those skilled in the art. Several features illustrated in FIGS. 2A and 2B will be discussed more fully as follows.

Small signal PNP transistor 50 (Q1) provides a power management function by switching a positive 5 volt supply 52 employed by the hall effects transducer 32 and other circuit elements not utilized when the winch is not operating. The primary controlling element in current limiter 30 is a micro-controller 54. In the preferred embodiment of the present invention, micro-controller 54 is an eight bit micro-controller manufactured by MicroChip, Inc. under product No. PIC16C71. Micro-controller 54 is a high performance, low cost CMOS fully static EPROM microcontroller with on-chip analog-to-digital conversion.

Micro-controller 54 has four analog-to-digital (A/D) inputs. The A/D convertor of micro-controller 54 translates analog input voltage between zero and Vref to an eight bit digital value (zero to 255 decimal). Analog input 54a measures a threshold adjustment potentiometer 57 voltage to establish an overcurrent condition. Analog input 54b measures battery voltage as taken from voltage supply 56. Analog input 54c measures the output of the hall effects transducer 32. Analog input 54d provides a voltage reference (Vref) input. The output of the hall effects transducer 32 is measured during every cycle of the maintain control loop, described more fully hereafter. The battery voltage is monitored at analog input 54b during every cycle of the maintain control loop. As may be appreciated, resisters 58 and 60 provide voltage division to scale the potential of voltage supply 56.

The voltage threshold taken from potentiometer 57 is the primary input determining a point at which a current overload condition begins. Thus, analog input 54a is calibrated by manipulation of potentiometer 57. As may be appreciated, the voltage source for the potentiometer 57 corresponds to the precise voltage reference applied to analog input 54d of micro-controller 54. This coordinates the threshold trip point with a precise voltage supply, and thereby provides a more accurate and constant trip point.

In FIG. 2B, transistors 68 and 70 detect the state of the power in signal 26 and power out signal 28, respectively. As previously indicated, current limiter 30 merely detects the present state of power out signal 28, but dictates further application of the power in signal 26, presented as the signal 26', to the solenoid pack 22. More particularly, the power in signal 26 is applied via a relay 72 to solenoid pack 22. Power in signal 26 connects to the common terminal 72a of relay 72. Relay 72 selectively couples terminal 72a to terminal 72b. Terminal 72b, therefore, delivers the qualified power in signal 26' to the solenoid pack 22.

Thus, current limiter 30 selectively delivers the power in signal 26 to the solenoid pack 22, i.e., may shutdown motor 12 when collecting cable 14 against the load 16. Furthermore, current limiter 30 senses the state of both power in signal 26 and power out signal 28, and dictates whether the power in signal 26 is applied to the solenoid pack 22 as a function of a present winch system 10 state of operation.

Programming micro-controller 54 is by state machine design. As illustrated herein, the state machine includes states 0 through 7, with an additional "sleep" mode state invoked as a power conservation measure. Furthermore, micro-processor 54 employs a state counter and fixed execution time control loop to measure the duration of each state, and thereby provide an additional transition condition, e.g., state time-out, for certain states as described more fully hereafter.

Micro-controller 54 further includes a diagnostics interface 55, i.e., a serial port, for monitoring activity of micro-controller 54 during programming and testing development. Interface 55 would not, however, necessarily be employed in a commercial embodiment of current limiter 30. As may be appreciated, interaction with micro-controller 54 during development by way of interface 55 should be limited so as not to interfere with the normal processing and control loops implemented under direction of micro-controller 54.

Figure 3:
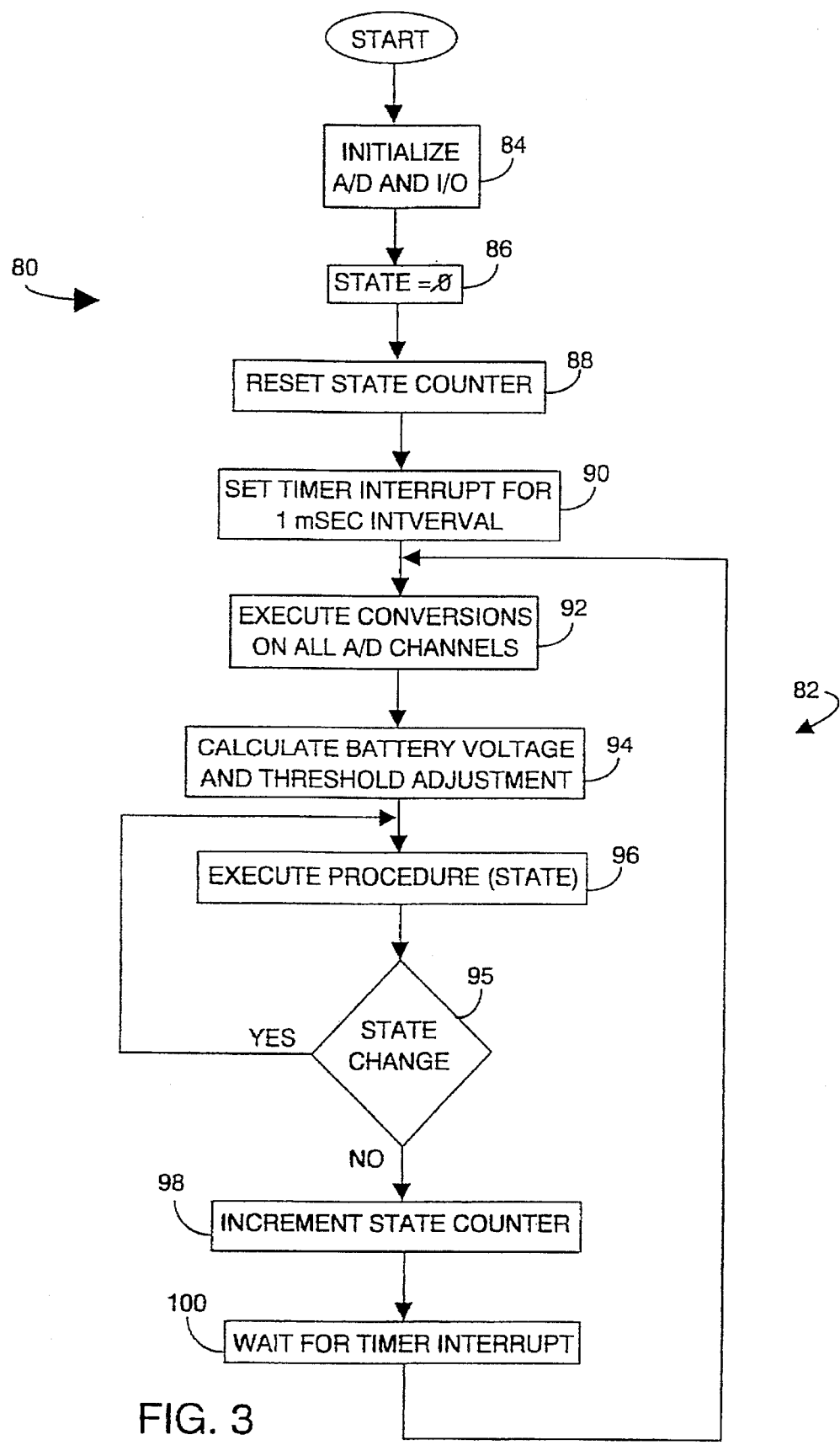
FIG. 3 is a flow chart illustrating operation of the current limiting device of the present invention including initialization procedures and a main control loop.

FIG. 3 illustrates programming of micro-controller 54 including an initialization sequence 80 and a main control loop 82. The initialization sequence begins in block 84 where micro-controller 54 initializes the analog-to-digital components and input and output (I/O) resources.

Micro-controller 54 employs a variable STATE to drive transition from one state to the next. In other words, a switch control structure references variable STATE to select one of a collection of procedures, each corresponding to a state of operation. In block 86, micro-controller 54 initializes the variable STATE to a value zero, state zero being a default state of operation. In block 88, micro-controller 54 resets a state counter register. The state counter register represents the duration of each state of operation. In block 90, the timer interrupt of micro-controller 54 is set for a one millisecond interval. In block 92, micro-controller 54 executes conversions on all analog-to-digital channels.

Micro-controller 54 calculates in block 94 the battery voltage and threshold adjustment. More particularly, micro-controller 54 compensates for battery voltage variation to maintain appropriate current magnitude thresholds corresponding to a given pulling force reference, i.e., as the battery 20 voltage decreases the current trip level increases or as battery 20 voltage increases the current trip level decreases. By adjusting the current trip levels, described more fully hereafter, as a function of present battery voltage, the current thresholds employed as trip points correspond to a consistent load force reference. In this manner, the method of inferring load force as a function of current drawn by motor 12 accurately reflects load forces applied by motor 12.

Continuing to block 96, micro-controller 54 executes a selected procedure, i.e., one of the procedures illustrated in FIGS. 4–11 as described hereafter, as a function of the variable STATE. Each of these procedures can drive the state machine into a next state by assigning a new value to the variable STATE. Following block 96, therefore, micro-controller 54 detects in decision block 95 a change in the variable STATE, and returns to block 96 if the variable STATE has changed. Otherwise processing advances to block 98. Thus, upon a state change micro-controller 54 immediately executes a new state procedure in block 96, but otherwise completes one iteration of the main control loop 82. In block 98, the state counter register is incremented to reflect one iteration of the main control loop 82. Continuing to block 100, micro-controller 100 waits for the interrupt timer. With the interrupt timer set for one millisecond and the state counter register incremented once for every iteration of main control loop 82, the state counter register reflects a duration of each state.

FIGS. 4–11 describe individually each of the procedures available for execution in block 96 as a function of the current value of the variable STATE. As may be appreciated, a simple switch or case control structure referencing the variable STATE, drives micro-controller 54 into one of the procedures illustrated in FIGS. 4–11.

Each of states 0–7 may be associated generally with a given mode of operation for current limiter 30 as follows. State 0 is an off or idle state pending user activation of remote station 24 into either the power in mode or power out mode. State 1 corresponds to an initial interval of operation referred to herein as an inrush interval wherein motor 12 draws, even under normal operation, an unusually large magnitude current ($I_2$ as described hereafter) during start-up. State 2 corresponds to an error condition wherein motor 12 draws current beyond that expected during the inrush interval. State 3 is a normal run state. State 4 corresponds to an overcurrent condition relative to a relatively smaller magnitude current ($I_1$ as described hereafter) threshold, i.e., when motor 12 draws current in excess of a normal operation current threshold. State 5 corresponds to a condition which is latched by an excess current condition. State 6 is an initial reset state. State 7 is a reset state.

Figure 4:
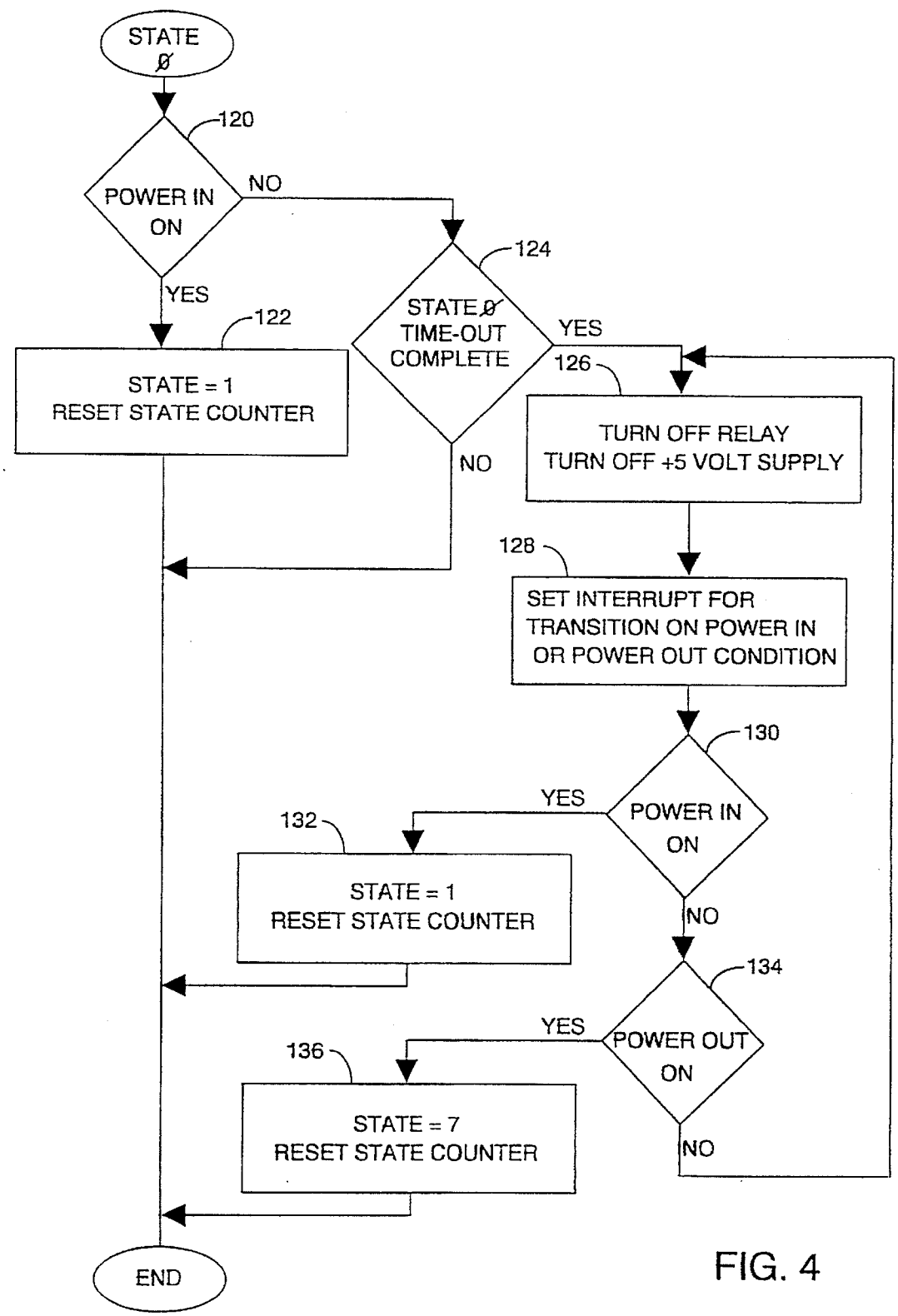
FIGS. 4–11 illustrate procedures executed in the main control loop of FIG. 3 during corresponding operational states.

FIG. 4 illustrates programming of micro-controller 54 when in state 0. State 0 corresponds to the following conditions: power in signal 26 off, power out signal 28 off, relay 72 enabled, and no overcurrent condition detected.

If no power in signal 26 or power out signal 28 command is received for a programmed state 0 time-out interval, power management switch, i.e., transistor 50 (FIG. 2A), is turned off and the micro-controller 54 is placed in a sleep mode. The state 0 time-out interval corresponds to a time from the last power out or power in command to initiation of sleep mode. A suggested state 0 time-out interval is one minute. In FIG. 4, state 0 procedure begins in decision block 120 where the power in signal 26 is evaluated. If the power in signal 26 is on, then processing advances to block 122 where the variable STATE is assigned the value 1 and the state counter is reset to 0. Processing then terminates following execution of block 122. If, however, the power in signal 26 is not on, then processing branches from decision block 120 to decision block 124 where micro-controller 54 determines whether a sleep mode is required, i.e., checks a state 0 time-out interval. If no sleep mode is required, processing terminates from the NO branch of decision block 124. If, however, a sleep mode is indicated in decision block 124, then processing advances to block 126 where micro-controller 54 turns off relay 72, and also turns off transistor 50 to shutdown the 5 volt supply. Continuing to block 128, micro-processor 54 sets the interrupt for transition on a power in or power out condition.

Following block 128, micro-controller 54 determines in decision block 130 whether a power in on condition exists. If a power in on condition exists, processing branches through block 132 where the variable STATE is assigned the value 1 and the state counter is reset to 0. Otherwise, processing branches from decision block 130 to decision block 134 where micro-controller 54 determines whether a power out on condition exists. If a power out on condition exists, then processing branches through block 136 where the variable STATE is assigned the value 7 and the state counter is reset to 0. Following execution of each of blocks 132 and 136, processing terminates. If no power out on condition is detected in decision block 134, then processing branches from decision block 134 back to block 126. Thus, current limiter 30 remains in a sleep mode until the next power in on condition or the next power out on condition arises.

As indicated in FIG. 4, state 0 maintains the sleep mode until a power in on signal 26, or power out on signal 28 condition occurs. If power in on condition occurs, transition to state 1 next occurs, or until a power out on condition is detected, in which case transition to state 7 occurs.

Figure 5:
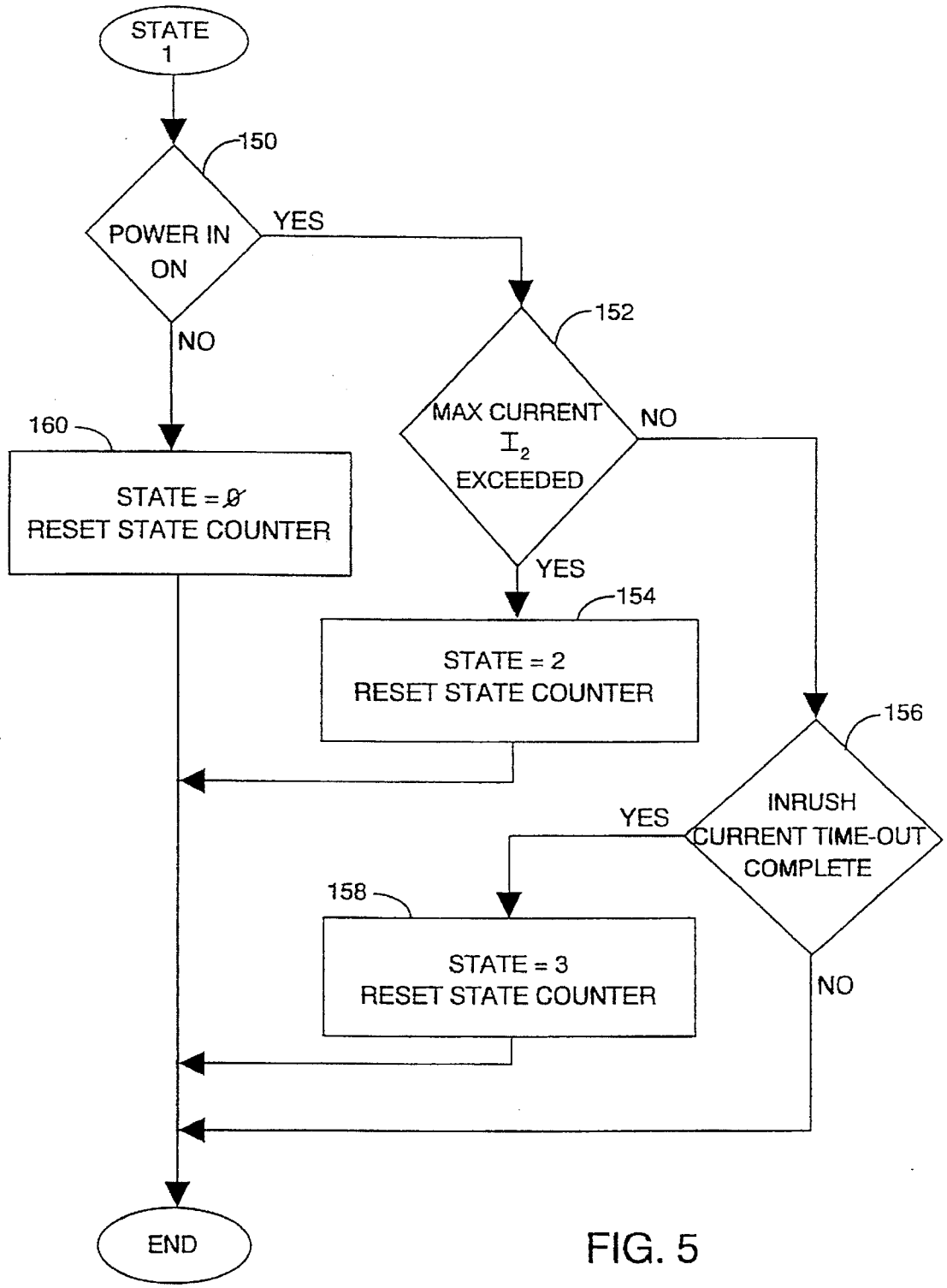

FIG. 5 illustrates programming of micro-controller 54 when in state 1. State 1 corresponds to the following conditions: power in signal 26 initially on (inrush period), power out signal 28 off, relay 72 enabled, and maximum current 12 is not exceeded.

Processing begins in decision block 150 where the power in signal 26 is interrogated. If the power in signal 26 is on, then processing advances to decision block 152 where micro-controller 54 determines whether a maximum current 12 magnitude has been exceeded. If the maximum current 12 magnitude has been exceeded, then processing branches to block 154 where the variable STATE receives the value 2 and the state counter is reset to 0.

If, however, the maximum current 12 magnitude is not exceeded, then processing advances from block 152 to decision block 156 where micro-controller 54 determines whether an initial inrush current state 1 time-out interval is complete. The state 1 time-out interval corresponds to the inrush interval for motor 12, e.g., 100 milliseconds. If the inrush current time-out interval is not complete, then processing terminates. If, however, the inrush current time-out interval is complete, then processing advances to block 158 where micro-controller 54 assigns to the variable STATE the value 3 and resets the state counter.

Returning to decision block 150, if the power in signal 26 is not on, then processing branches to block 160 where the variable STATE receives a value 0 and the state counter is reset to 0.

Figure 6:
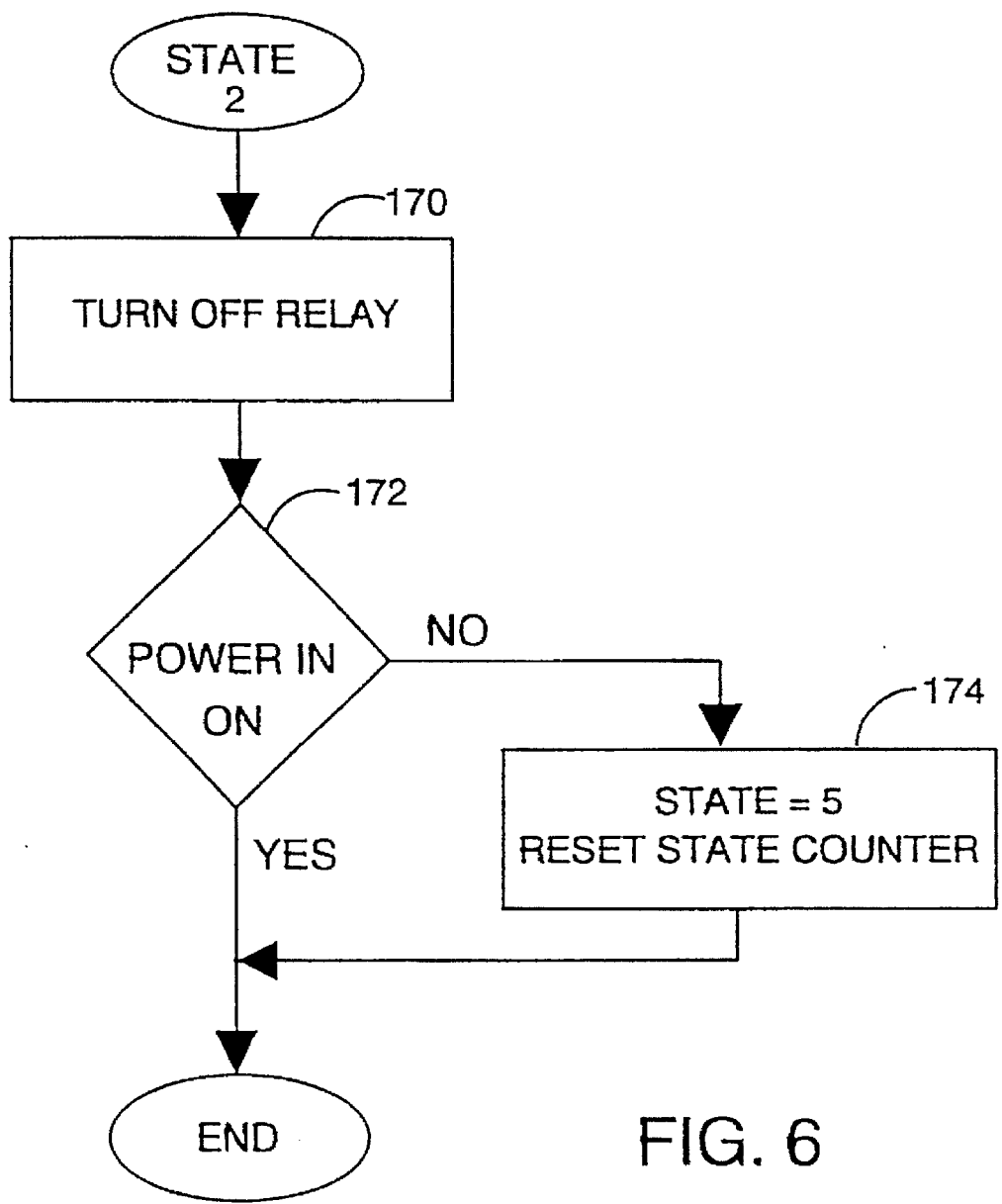

FIG. 6 illustrates programing of micro-controller 54 when in state 2. State 2 corresponds to the following conditions: power in signal 26 on, power out signal 28 off, relay 72 disabled, and maximum current 12 exceeded.

Beginning in block 170, micro-controller 54 turns off the relay 72 and advances to decision block 172 where the power in signal 26 is interrogated. If the power in signal 26 is on, then processing terminates. If, however, the power in signal 26 is not on then processing branches through block 174 where the variable STATE receives a value 5 and the state counter is reset to 0.

Figure 7:
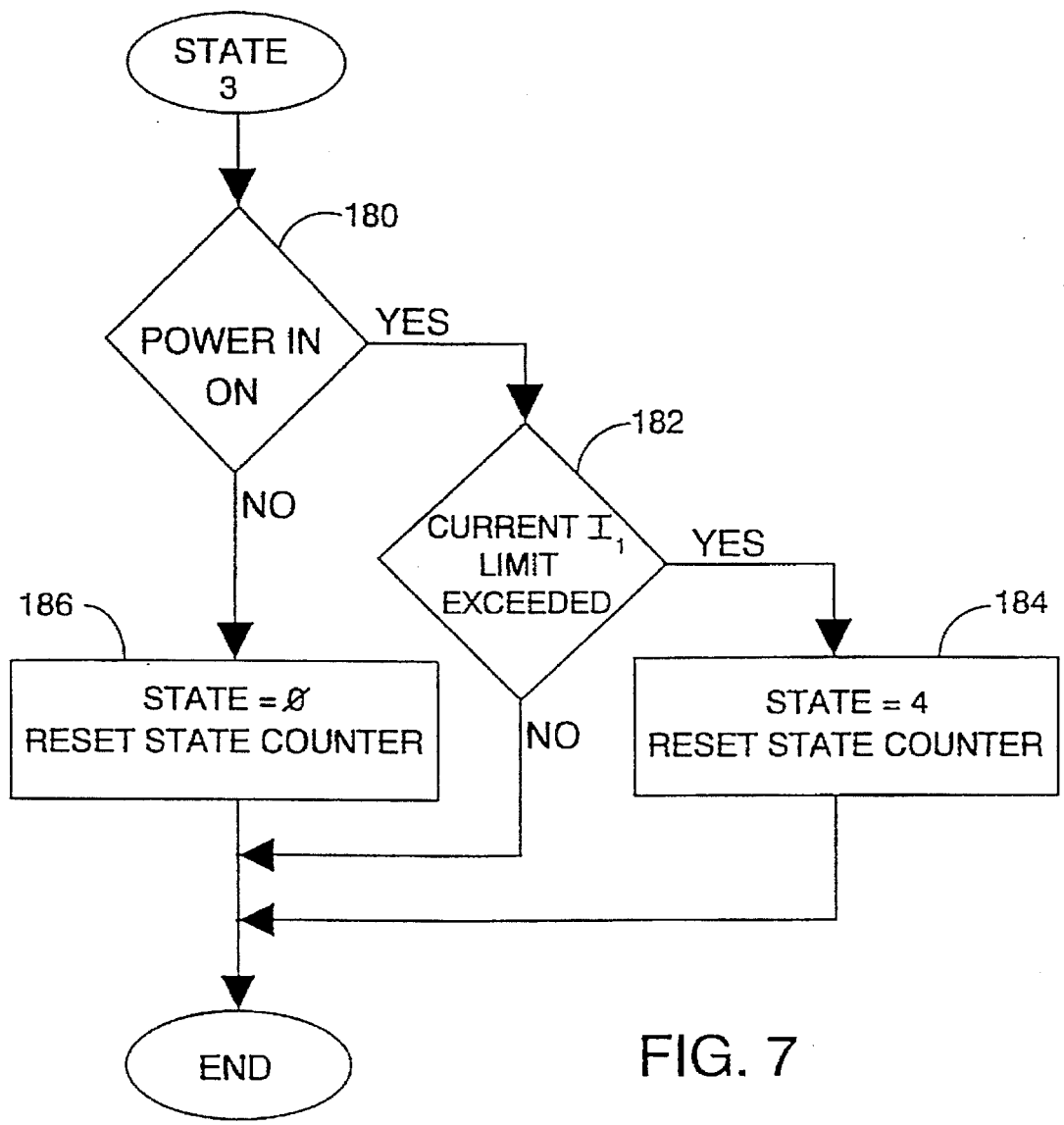

FIG. 7 illustrates operation of micro-controller 54 when in state 3. State 3 corresponds to the following conditions: power in signal 26 on (inrush period over), power out signal 28 off, relay 72 enabled, and no overcurrent condition. Beginning in decision block 180, micro-controller 54 determines whether the power in signal 26 is on. If power in signal 26 is on, then processing advances to decision block 182 where micro-controller 54 determines whether the current $I_1$ limit is exceeded. If the current $I_1$ limit is exceeded, then processing branches through block 184 where the variable STATE receives a value 4 and the state counter is reset to 0. If the current $I_1$ limit is not exceeded, then processing terminates from decision block 182. Returning to block 180, if the power in signal 26 is not on, then micro-controller 54 assigns in block 186 the value 0 to the variable STATE and resets the state counter.

Figure 8:
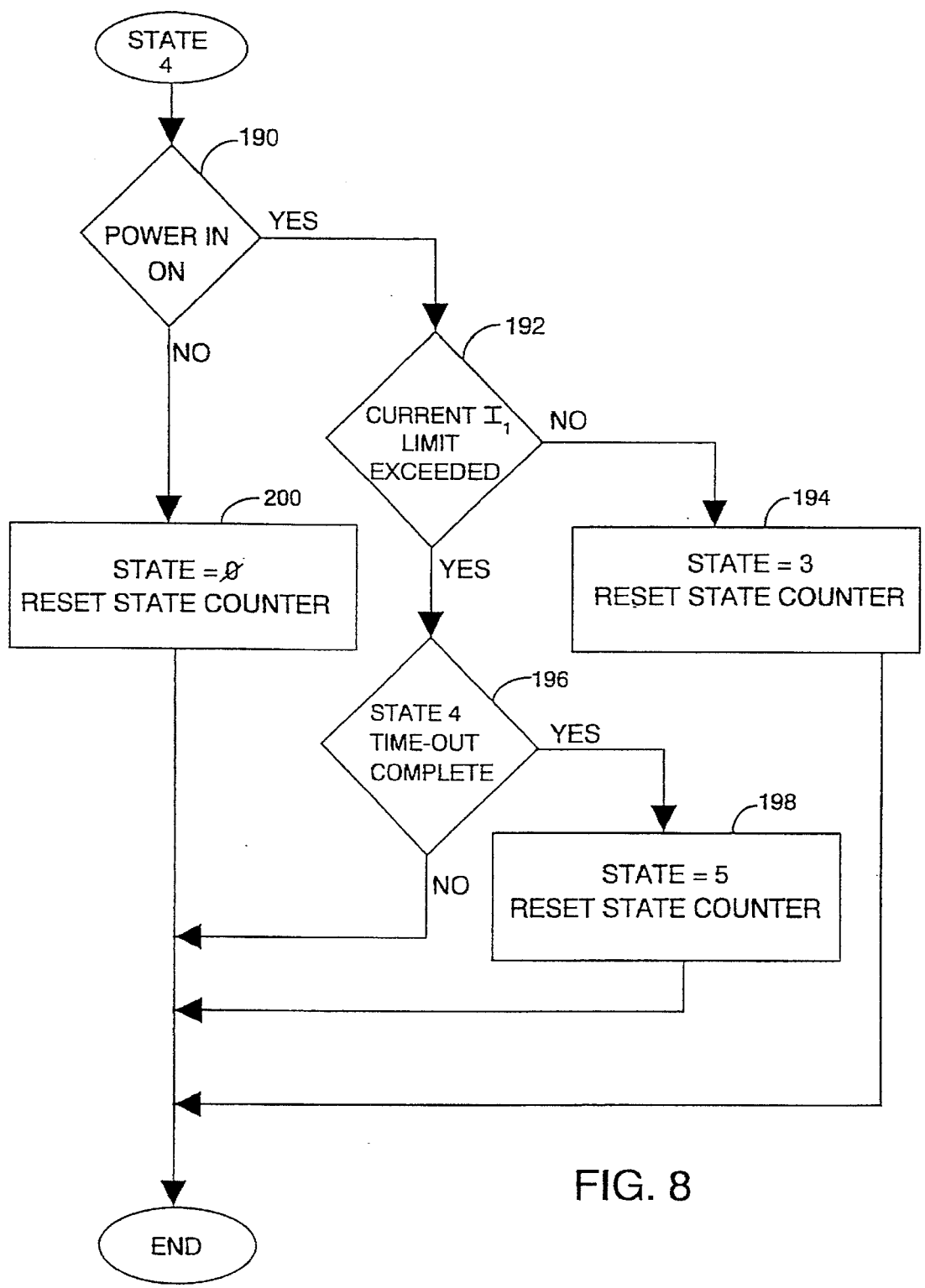

FIG. 8 illustrates operation of micro-controller 54 during state 4. State 4 corresponds to the following conditions: power in signal 26 on (inrush period over), power out signal 28 off, relay 72 enabled, and overcurrent condition exceeded. Beginning in decision block 190, micro-controller 54 interrogates the power in signal 26. If power in signal 26 is on, then processing advances to block 192 where micro-controller 54 determines whether the current $I_1$ limit has been exceeded. If the current $I_1$ limit has not been exceeded, then processing advances to block 194 where micro-controller 54 assigns to the variable STATE the value 3 and resets the state counter. If the current $I_1$ limit has been exceeded, then processing advances from block 192 to block 196 where micro-controller 54 determines whether a state 4 time-out interval is complete. The state 4 time-out interval represents the maximum time allowed for an overcurrent condition after the inrush interval, i.e., a maximum time for which current limiter 30 allows current flow in excess of the current $I_1$ limit. A 50 millisecond period for the state 4 time-out interval is suggested. If the state 4 time-out interval is complete, then processing branches through block 198 where micro-controller 54 assigns to the variable STATE the value 5 and resets the state counter to 0. If the state 4 time-out interval is not complete, then processing terminates from decision block 196. Returning to block 190, if the power in signal 26 is not on, then processing branches through block 200 where micro-controller 54 assigns to the variable STATE the value 0 and resets the state counter to 0.

Figure 9:
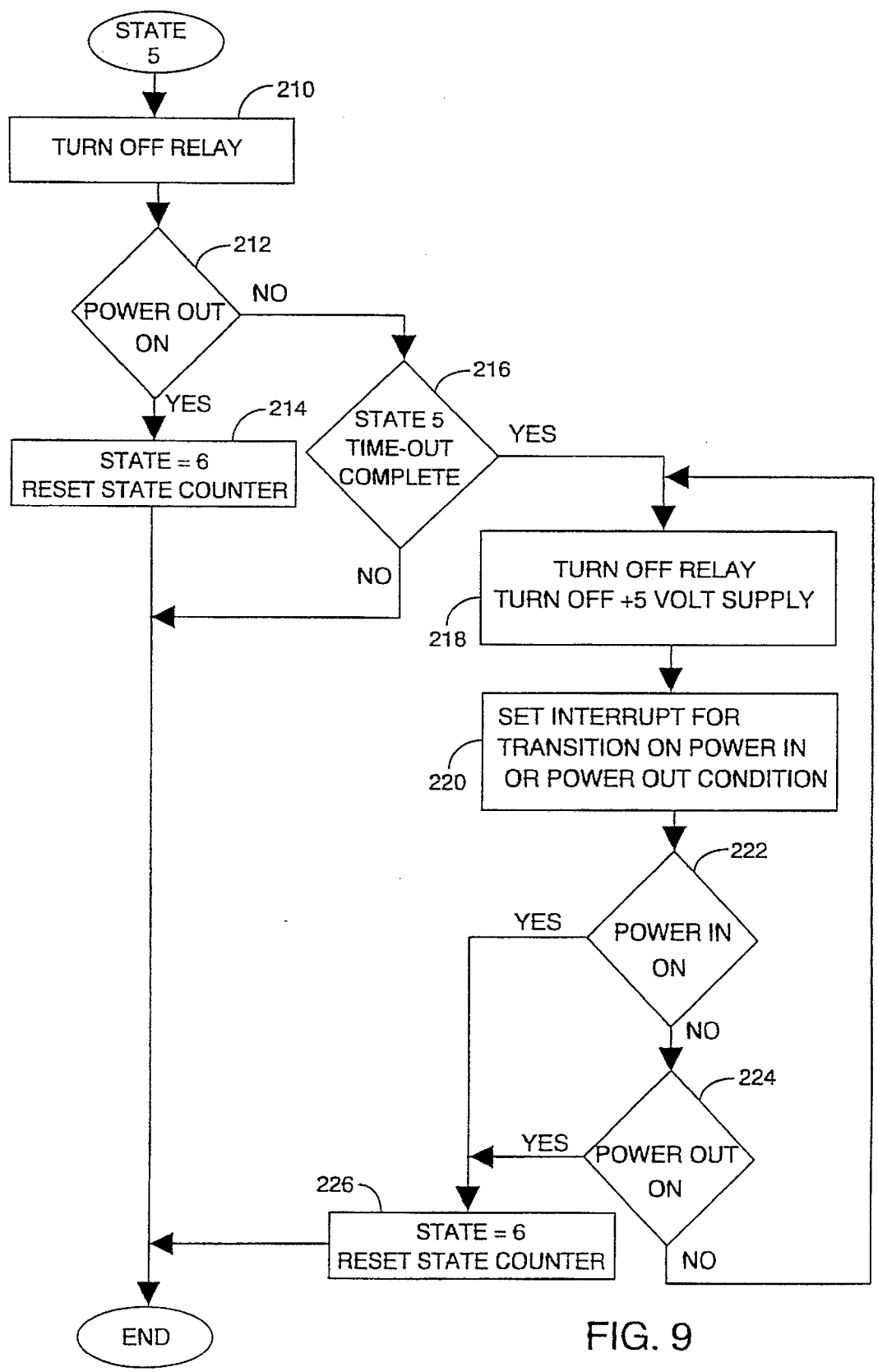

FIG. 9 illustrates operation of micro-controller 54 during state 5. State 5 corresponds to the following conditions: power in signal 26 either on or off, power out signal 28 off, relay 72 disabled, and overcurrent condition was exceeded. Micro-controller 54 turns off relay 72 in block 210 and advances to decision block 212 where the state of power out signal 28 is detected. If the power out signal 28 is on, then processing branches through block 214 where the variable STATE receives a value 6 and the state counter is reset to 0. If, however, the power out signal 28 is not on, then processing branches from block 212 to decision block 216 where micro-controller 54 determines whether a state 5 time-out interval is complete. The state 5 time-out interval is the time allotted from the last power out command or power in command before current limiter 30 enters the sleep mode. A 60 second state 5 time-out interval is suggested. If the state 5 time-out interval is not complete, then processing terminates. Otherwise, processing advances from decision block 216 to block 218, i.e., goes into a sleep mode, where micro-controller 54 turns off relay 72 and turns off transistor 50 to shutdown the 5 volt supply for current limiter 30. Continuing to block 220, micro-controller 54 sets an interrupt for transition on the power in signal 26 or power out signal 28 condition.

Continuing to decision block 222, micro-controller 54 determines whether power in signal 26 is on. If the power in signal is not on, then processing advances to decision block 224 where the power out signal 28 is interrogated. If either of the power in signal 26 or the power out signal 28 is on, then processing advances from corresponding blocks 222 and 224 to block 226 where the variable STATE receives a value 6 and the state counter is reset. If, however, neither the power in signal 26 nor the power out signal 28 is on, then processing returns from decision block 224 to block 218 to continue the sleep mode of current limiter 30.

Figure 10:
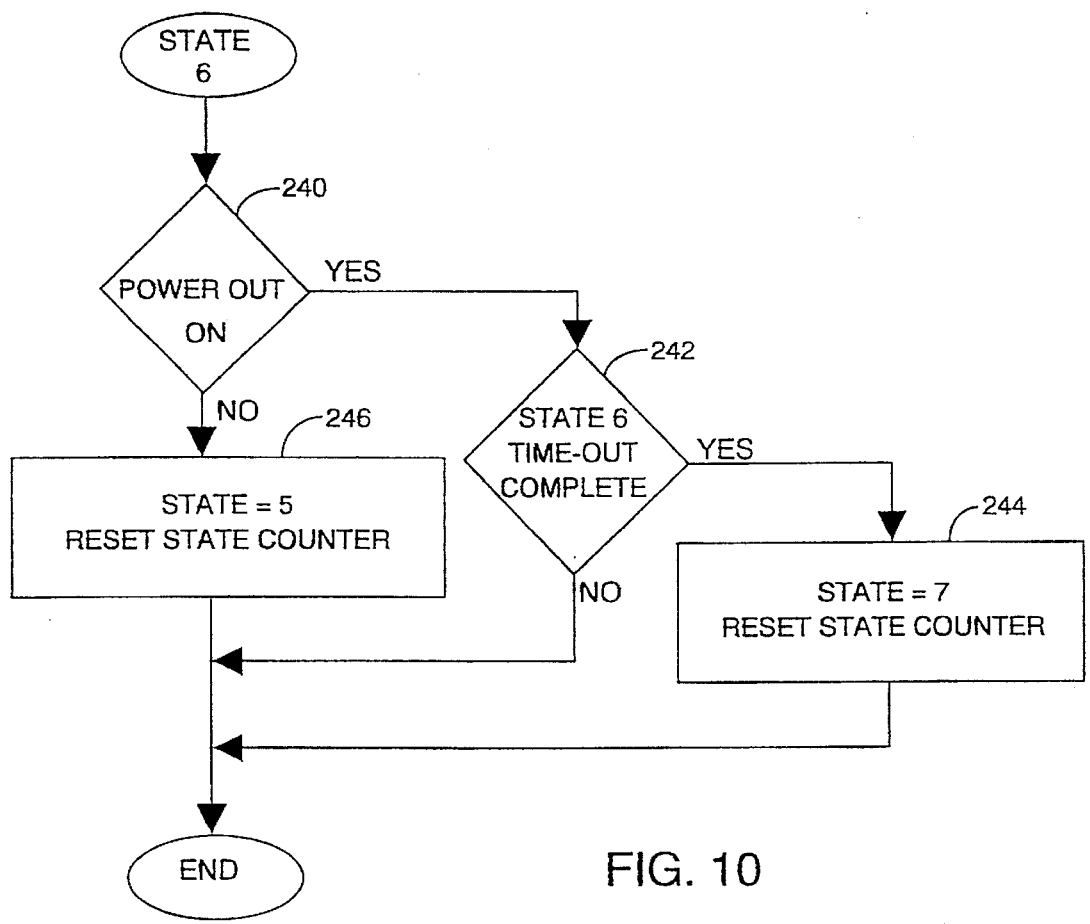

FIG. 10 illustrates operation of micro-controller 54 during state 6. State 6 corresponds to the following conditions: power in signal 26 off, power out signal 28 on, and relay 72 disabled. In decision block 240, micro-controller 54 interrogates the status of the power out signal 28. If on, processing branches to decision block 242 where micro-controller 54 determines whether a state 6 time-out interval is complete. The state 6 time-out interval is the minimum time that the power out command must be on to allow reset from a previous overcurrent condition. A suggested state 6 time-out interval is 500 milliseconds. If the state 6 time-out is complete, then processing branches through block 244 where the variable STATE receives a value 7 and the state counter is reset to 0. If, however, the power out signal 28 is not on, then processing branches through block 246 where the variable STATE receives the value 5 and the state counter is reset to 0.

Figure 11:
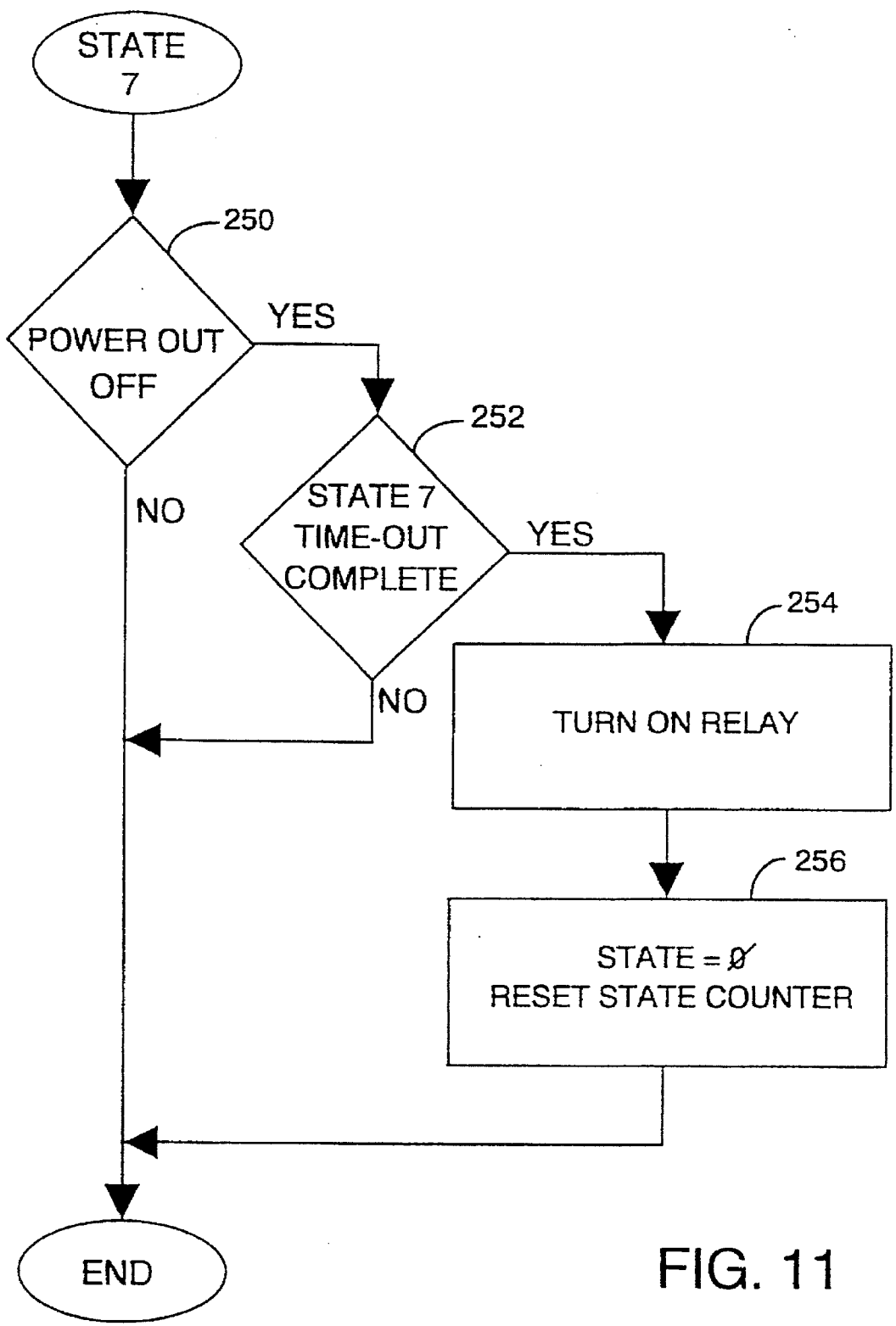

FIG. 11 illustrates operation during state 7. State 7 corresponds to the following conditions: power in signal 26 off, power out signal 28 on, relay 72 disabled, and overcurrent condition reset (exits to state 0). Beginning in decision block 250, if the power out signal 28 is not on, then processing terminates. Otherwise, processing branches to decision block 252 where micro-controller 54 determines whether the state 7 time-out interval is complete. The state 7 time-out interval represents the minimum time that the power out signal 28 must be off before returning to state 0. A suggested state 7 time-out interval is 75 milliseconds. If the state 7 time-out interval is not complete, then processing terminates. When the state 7 time-out interval is complete, however, processing branches through block 254 where micro-controller 54 turns on relay 72 and through block 256 where the variable STATE receives a value 0 and the state counter is reset to 0.

Figure 12:
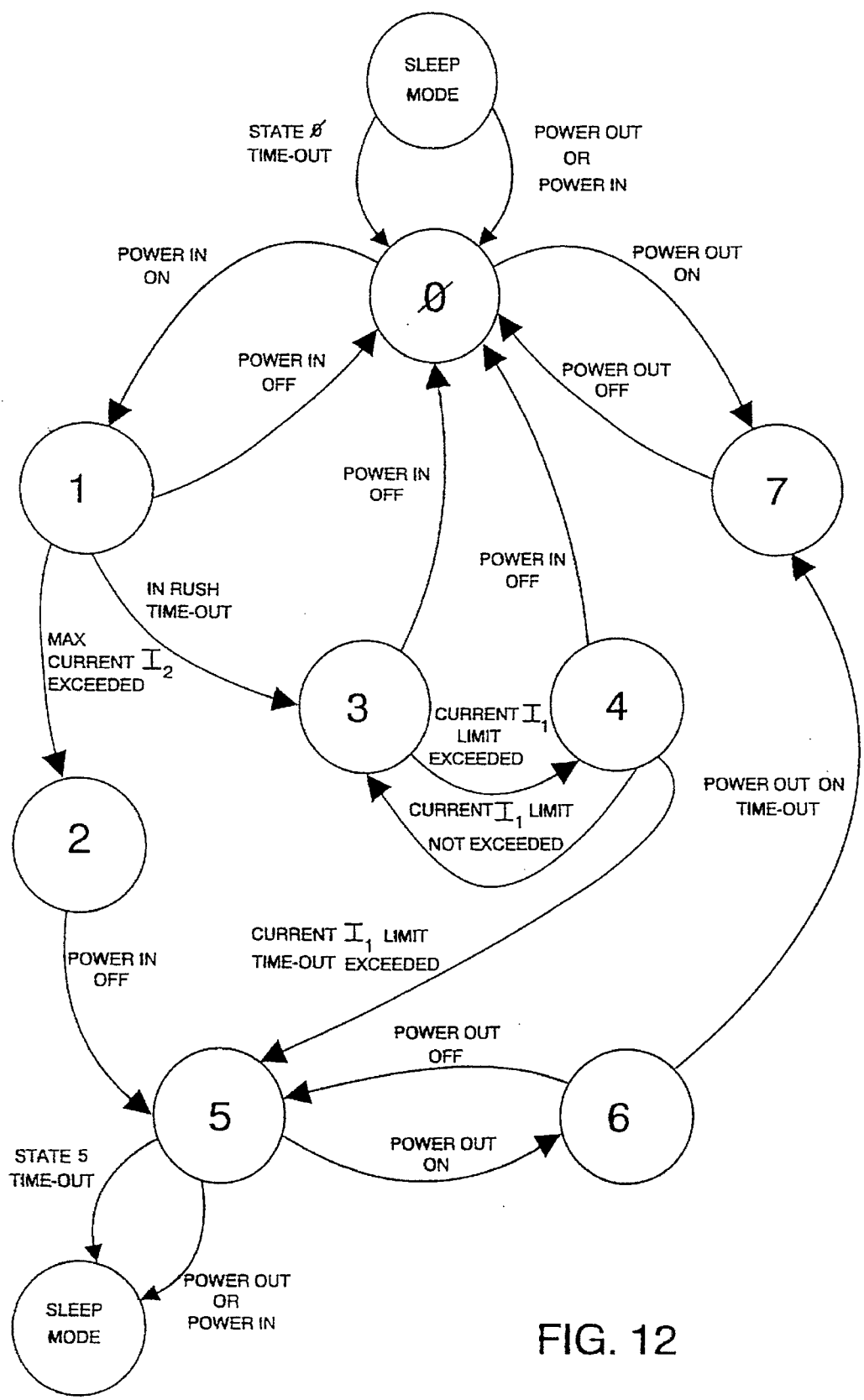
FIG. 12 is a state diagram illustrating relationships between operational states and conditional transitions therebetween.

FIG. 12 illustrates by state diagram transitions among the states 0–7. The default state is state 0 and transition out of state 0 into one of states 1 or state 7 occurs upon assertion of the power in signal 26 or power out signal 28, respectively. Transition back to state 0 from states 1 and 7 occurs upon termination of the power in signal 26 or power out signal 28. State 7 may continue indefinitely, terminating with return to state 0 upon the condition of power out signal 28 being turned off.

State 1, however, may return directly to state 0 only if the power in signal 26 is turned off during the initial inrush interval. If the inrush interval is complete during state 1, then upon the corresponding inrush time-out condition transition to state 3 occurs. This corresponds to normal operation wherein a relatively high current flow is allowed during an initial inrush interval.

If the maximum current 12 magnitude is exceeded during the inrush interval, i.e., abnormal operation, then transition from state 1 to state 2 occurs. Under such abnormal operating conditions, processing in state 2 shuts down motor 12, i.e., turns off relay 72 and remains in state 2 until the power in signal 26 has been terminated and transition from state 2 to state 5 occurs. Transition from state 5 to state 6 occurs upon activation of the power out signal 28.

Thus, following detection of a maximum current 12 magnitude exceeded condition in state 1, i.e., abnormal operating conditions during an initial inrush interval, the operator must activate the power out signal 28 to move forward to state 6.

Once placed in state 6, transition back to state 5 may occur if the power out signal 28 is turned off, but otherwise transition to state 7 will occur upon a power out signal 28 on condition time-out interval. Once in state 7, the operator must turn off the power out signal 28 to return to state 0, otherwise operation in state 7 generally represents powered deployment of cable 14 from motor 12 in direction 14b.

Thus, transition from state 1 through states 2, 5 and 6 represents an overcurrent error condition resulting in a shutdown of the motor 12 when a maximum current $I_1$ limit has been exceeded during an initial inrush interval.

As noted hereinabove, transition from state 1 to state 3 denotes normal operation when an initial inrush interval has been completed after which a relatively lower current $I_1$ limit is employed during a power in operation of motor 12. State 3 may return any time directly to state 0 upon termination of the power in signal 26.

Transition from state 3 to state 4 occurs, however, any time the relatively lower current $I_1$ limit is exceeded. In state 4, the current $I_1$ limit may be exceeded for a brief state 4 time-out interval, but upon completion of such state 4 time-out interval, transition to state 5 occurs, i.e., processing under abnormal conditions detected. Transition from state 4 back to state 0 occurs, however, when the power in signal 26 is deactivated prior to the state 4 time-out interval. Transition from state 4 back to state 3 will occur any time during the state 4 time-out interval that the current falls below the current $I_1$ limit.

Figure 13:
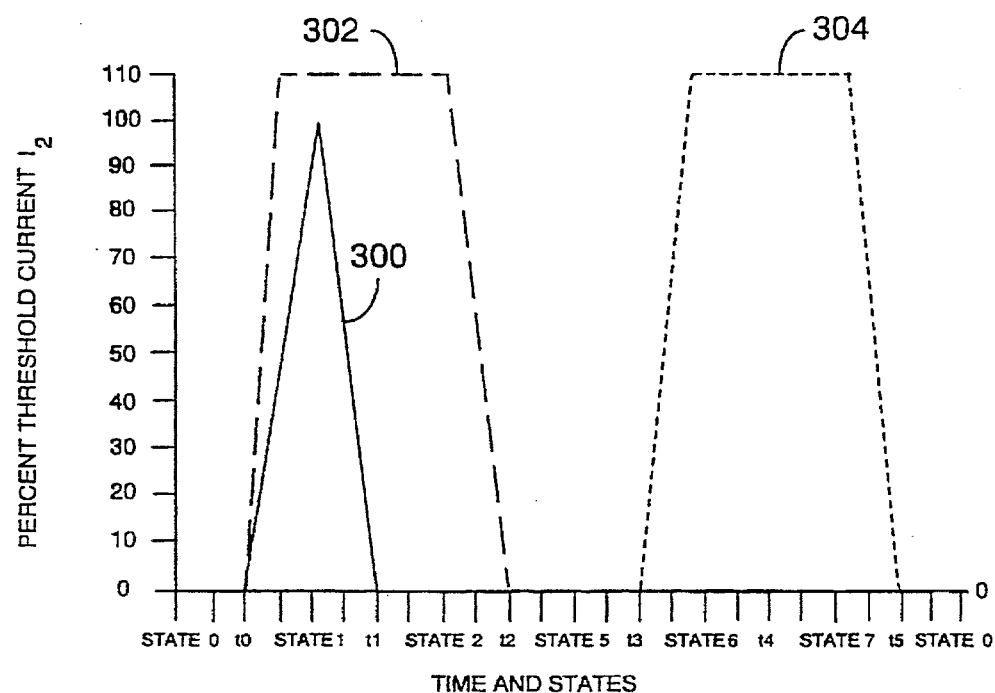
FIGS. 13–18 illustrate current versus time for various paths of operation through the state diagram of FIG. 12.

FIGS. 13–18 illustrate operation of winch system 10 by plotting current drawn by motor 12 through intervals of time, including indication of states of operation as described herein above. In FIGS. 13–18, the vertical axis represents a percentage of a selected current threshold. For example, the vertical axis of FIG. 13 represents the maximum current 12 magnitude and the vertical axis in FIGS. 14–18 represent the current $I_1$ limit. The horizontal axis in FIGS. 13–18 represents both time and sequential states of operation.

FIG. 13 represents an example of overcurrent during the initial inrush interval. In FIG. 13, signal 300 represents current drawn by motor 12, in particular the percentage of current drawn with respect to the current 12 magnitude. Signal 302 represents the condition of the power in signal 26, essentially a bistate signal, and signal 304 represents the condition of power out signal 28, also a bistate signal. Illustration of signals 300, 302 and 304 is provided to depict generally the relative timing, and not necessarily to scale or accurate signal shapes. Current limiter 30 is initially in state 0. At time $t_0$ the remote control station 24 moves to the power in position and the current limiter 30 enters state 1. The inrush current 300 to motor 12 rises quickly in state 1 to a value greater than the maximum current 12 magnitude. As a result, current limiter 30 enters state 2 and disconnects power from the solenoid pack 22 to motor 12 at time $t_1$, turning off motor 12 and causing signal 300 to return to zero. At time $t_2$, remote control station 24 returns to its center off position, equivalent to a power in signal 26 off, and current limiter 30 enters state 5. At time $t_3$ the remote control station 24 moves to the power out position and current limiter 30 enters state 6. After the appropriate time-out interval for state 6, at time $t_4$ current limiter 30 enters state 7. At time $t_5$ remote control station 24 returns to its center off position, equivalent to power out signal 28 off, and current limiter 30 returns to state 0.

Figure 14:
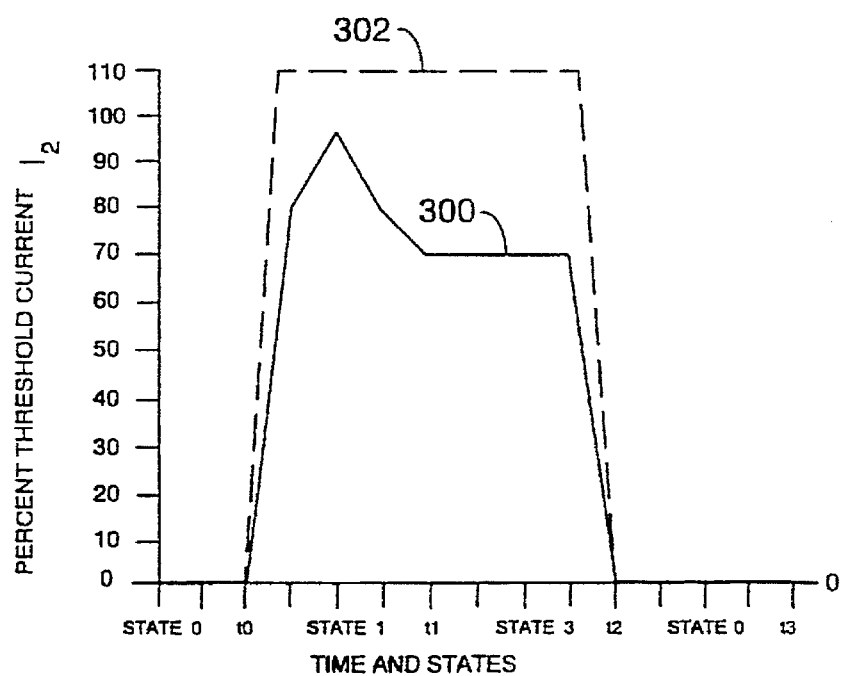

FIG. 14 illustrated normal operation, including entry into sleep mode. In FIG. 14, assume current limiter 30 has previously entered the sleep mode. At time $t_0$ remote control station 24 is placed in the power in position, current limiter 30 turns on the +5 V supply to non-critical circuit elements, turns on output relay 72, and enters state 1. The inrush current 300 to motor 12 rises quickly, but does not exceed the maximum current 12 limit during state 1. Current limiter 30 then enters state 3 at time $t_1$, i.e., following the state 1 time-out interval. At time $t_2$, remote control station 24 returns to its center off position, equivalent to power in signal 26 off, and current limiter 30 returns to state 0. After the state 0 time-out interval, at time $t_3$, current limiter 30 turns off the +5 V supply to non-critical circuits, turns off output relay 72, and goes into sleep mode.

Figure 15:
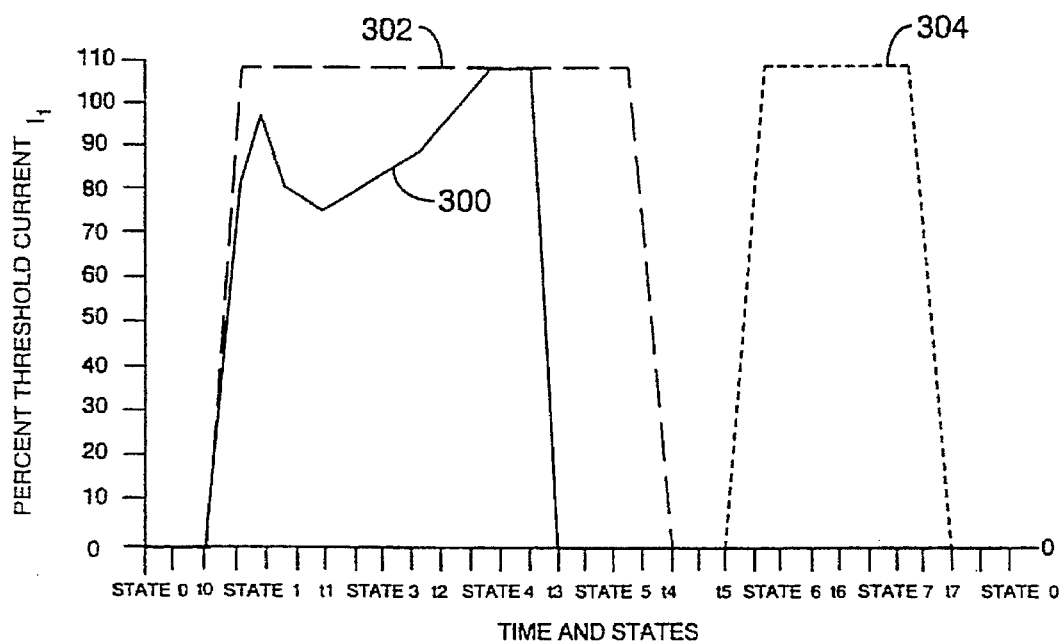

FIG. 15 illustrates an overcurrent condition relative to the current $I_1$ limit, i.e., an overcurrent condition following the initial inrush interval. In FIG. 15, current limiter 30 is initially in state 0. At time $t_0$ the remote control station 24 moves to the power in position and current limiter 30 enters state 1. The inrush current 300 to motor 12 rises quickly in state 1, but does not exceed the maximum current 12 magnitude. Current limiter 30 then enters state 3 after the state 1 time-out interval. At time $t_2$ the current 300 drawn by motor 12 exceeds the current $I_1$ magnitude and enters state 4. At time $t_3$ the current has exceeded the current $I_1$ magnitude for the state 4 time-out period, and current limiter 30 disconnects power from the solenoid pack 22, thereby turning off motor 12, driving motor current signal 300 to zero, and enters state 5. At time $t_4$ remote control station 24 returns to its center off position, equivalent to power in signal 26 off. At time $t_5$ the remote control station 24 moves to the power out position and current limiter 30 enters state 6. After the time-out interval for state 6, at time $t_6$ current limiter 30 enters state 7. At time $t_7$, remote control station 24 returns to its center off position, equivalent to power out signal 28 off, and current limiter 30 returns to state 0.

Figure 16:
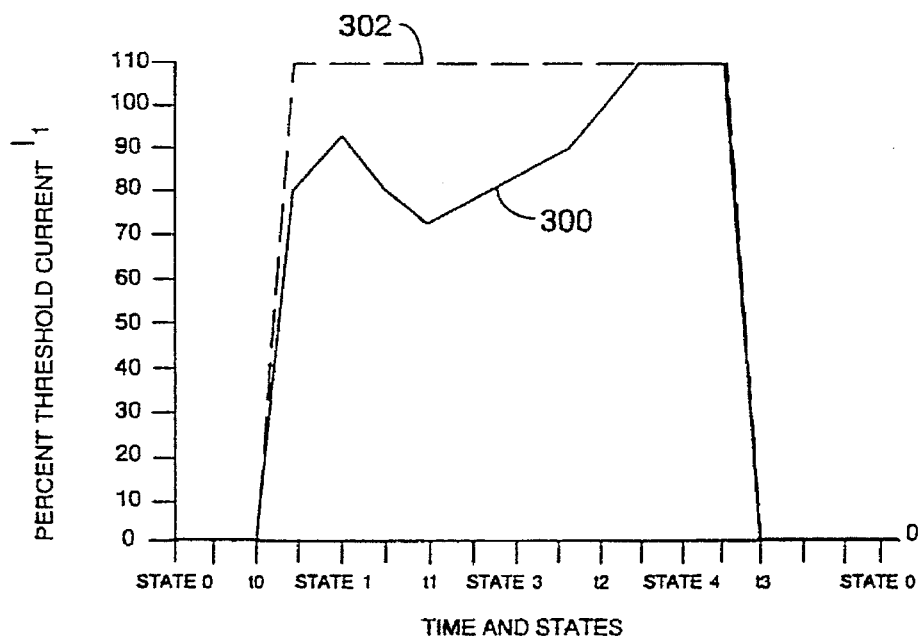

FIG. 16 illustrates an overcurrent condition relative to the current $I_1$ limit with power in signal 26 being discontinued before the state 4 time-out interval has elapsed. In FIG. 16, current limiter 30 is initially in state 0. At time $t_0$ remote control station 24 moves to the power in position and current limiter 30 enters state 1. The inrush current 300 to motor 12 rises quickly in state 1, but does not exceed the maximum current 12 magnitude. Current limiter 30 then enters state 3 after expiration of the state 1 time-out interval. At time $t_2$, the current drawn by motor 12 exceeds the current $I_1$ magnitude and current limiter 30 enters state 4. At time $t_3$, remote control switch 24 moves to the off position before the state 4 time-out interval is complete, and current limiter 30 returns directly to state 0.

Figure 17:
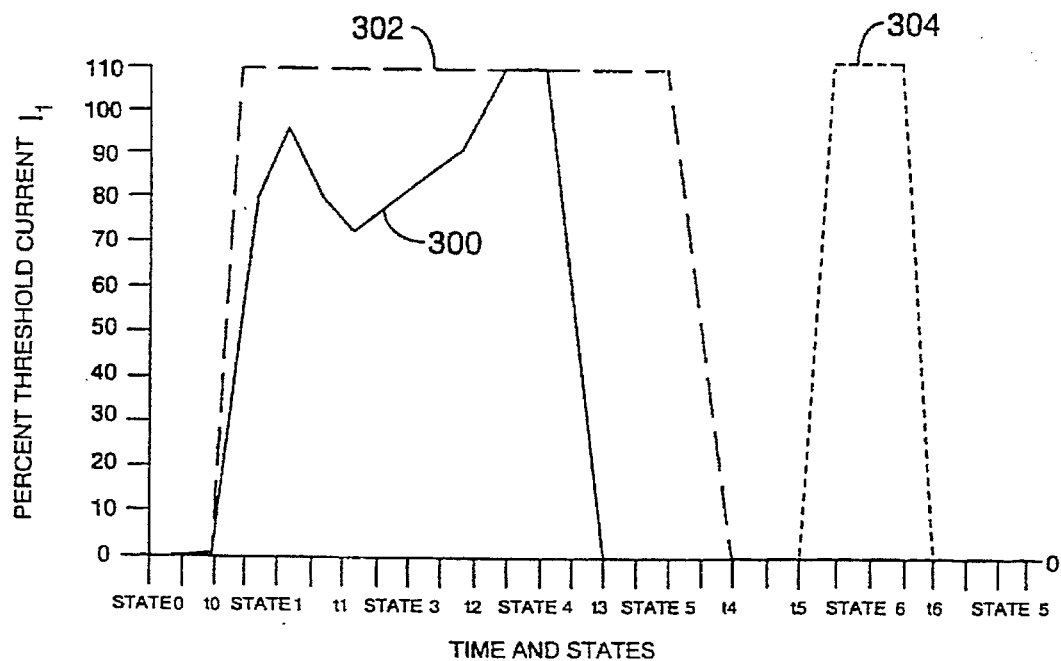

FIG. 17 illustrates an overcurrent condition relative to current $I_1$ limit including a failed reset time-out in state 6. In FIG. 17, current limiter 30 is initially in state 0. At time $t_0$ remote control station 24 moves to the power in position and current limiter 30 enters state 1. The inrush current 300 to motor 12 rises quickly in state 1, but does not exceed the maximum current $I_2$ magnitude. Current limiter 30 then enters state 3 after the state 1 time-out interval. At time $t_2$ the current signal 300 exceeds the current $I_1$ magnitude and current limiter 30 enters state 4. At time $t_3$ current signal 300 has exceeded the current $I_1$ limit for a maximum period of time, and current limiter 30 disconnects power from the solenoid pack 22, turning off motor 12, i.e., driving signal 300 to zero, and current limiter 30 enters state 5. At time $t_4$, remote control station 24 returns to its center off position, equivalent to power in signal 26 off. At time $t_5$, remote control station 24 moves to the power out position and current limiter 30 enters state 6. At time $t_6$, remote control station 24 returns to its center off position before the state 6 time-out interval and current limiter 30 returns to state 5 without resetting the overcurrent condition.

Figure 18:
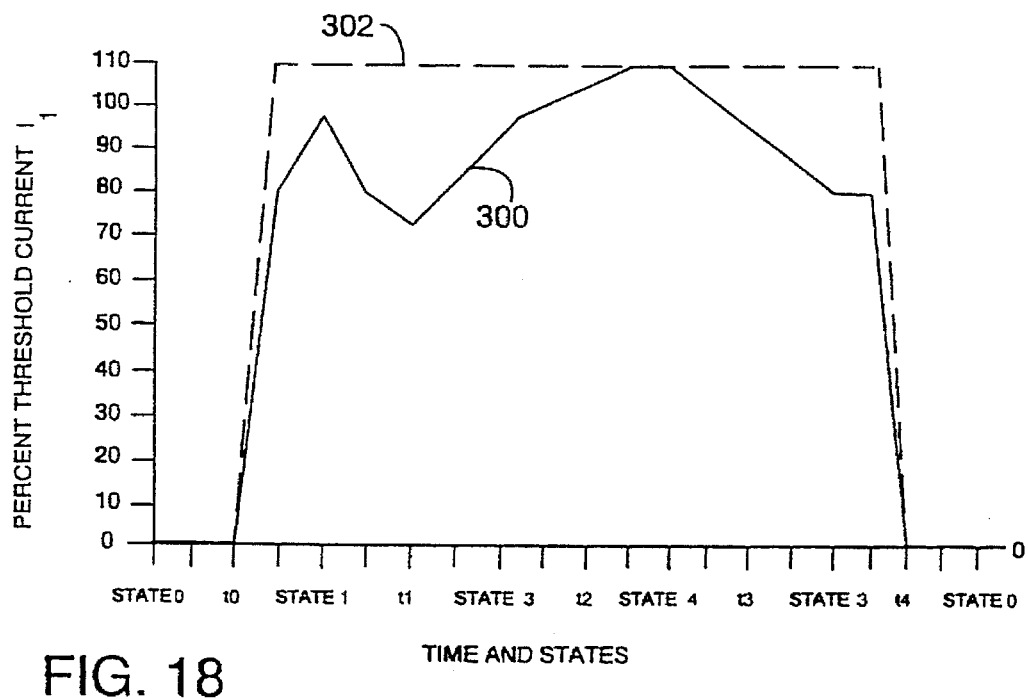

FIG. 18 illustrates a momentary overcurrent condition relative to the current $I_1$ limit. In FIG. 18, assume current limiter 30 has previously entered the sleep mode. At time $t_0$ remote control station 24 moves to the power in position and current limiter 30 turns on the +5 V supply to non-critical circuit elements, turns on output relay 72, and enters state 1. The inrush current 300 to the motor rises quickly but does not exceed the current $I_2$ magnitude during state 1. Current limiter 30 then enters state 3 at time $t_1$ after the state 1 time-out interval. At time $t_2$, the current signal 300 exceeds the current $I_1$ limit and state 4 begins. At time $t_3$ the current signal 300 drops to a level less than the current $I_1$ limit, before the state 4 time-out interval, and current limiter 30 returns to state 3. At time $t_4$, remote control station 24 returns to its center off position, equivalent to power in signal 26 off, and current limiter 30 returns to state 0.

Returning to FIG. 1, winch system 10 may be enhanced by incorporating additional inputs to current limiter 30. In the illustrated example, motor 12 includes a layer output 400 representing the number of layers of cable 14 residing on the spool of motor 12. Implementation of such sensing devices as represented by layer output 400 in FIG. 1 will be apparent to those skilled in the art. Layer output 400 is applied to the current limiter 30 as an additional operational input parameter for enhanced use of winch system 10.

Because the lever arm changes as a function of the number of layers on the motor 12 spool, a given magnitude of current drawn by motor 12 actually represents a range of potential pulling force provided by motor 12 relative to cable 14. Similarly, a fixed magnitude pulling force by motor 12 corresponds to a range of potential current magnitudes, depending on the number of layers on the motor 12 spool, i.e., as a function of layer output 400. For example, to achieve a given pulling force with a maximum number of layers, a given magnitude current is drawn by motor 12, but a lesser magnitude of current is drawn by motor 12 when the spool thereof has fewer layers of cable 14 thereon.

As described herein above, current limiter 30 is employed to shutdown motor 12 operation when a given magnitude current is detected and this actually corresponds to a range of pulling force.

Current limiter 30 may be modified, therefore, to provide as a shut-off condition a given magnitude pulling force. To accomplish this, threshold calculations performed in block 94 of FIG. 3 account for the layer output 400 and offset such current threshold trip points as a function of the lever arm advantage provided by the spool of motor 12, i.e., as a function of the layer output 400. Generally, the current threshold trip points are reduced as the layer output 400 indicates fewer layers of cable 14 on the spool of motor 12. Such adjustment in threshold trip points as a function of layer output 400 provides as a shut-off condition a constant magnitude pulling force. Thus, where a constant magnitude pulling force is taken as a more desirable shut-off condition, i.e., more desirable than a range of pulling force magnitude as provided by to a fixed current threshold despite layer output 400, current limiter 30 may be modified to shutdown motor 12 operation when the selected magnitude pulling force is exceeded.

Thus, an improved winch system has been shown and described. The current limiter allow a relatively high magnitude of current during an initial inrush interval. During such initial inrush interval, if the relatively high magnitude threshold is exceeded, then processing advances to handle the abnormal operating condition. Following the initial inrush interval, current limiter 30 employs a relatively lower current threshold level to detect excess load conditions on the motor. In this manner, the motor and associated support structures are protected against an overload condition throughout operation, i.e., commencing with the inrush interval and continuing throughout operation of the motor. Furthermore, the current limiter may take into account variation in battery voltage to establish a consistent current threshold trip point, and thereby consistently shutdown winch operation relative to a given pulling force, or range of pulling force. Finally, the current limiter can take into account a variable lever arm resulting from variation in the number of layers of wire rope on the motor spool to establish as a shutdown condition, when desired, a relatively fixed magnitude pulling force, as opposed to a range of pulling force as associated with a constant magnitude current threshold.

It will be appreciated that the present invention is not restricted to the particular embodiment that has been described and illustrated, and that variations may be made therein without departing from the scope of the invention as found in the appended claims and equivalents thereof.

What is claimed is:

1. A winch system for applying a force to a load, comprising:

a motor drawing energy during normal operation, said normal operation including an initial first magnitude energy draw and a subsequent second magnitude energy draw;

an energy sensing device detecting a magnitude of energy drawn by said motor;

a shut-off device selectively halting operation of said motor;

a control device operating said shut-off device and monitoring said energy sensing device, said control device activating said shut-off device during an initial inrush interval of normal operation when said motor draws energy in excess of a first magnitude threshold and during a subsequent interval of operation after said initial inrush interval is complete when said motor draws energy in excess of a second magnitude threshold; and at least one of said first and second magnitude thresholds being adjustable during said normal operation in response to a change in operating voltage.

2. The winch system according to claim 1 wherein said motor is an electric winch motor and said energy sensing device is an electric current sensing device monitoring electric current drawn by said winch motor.

3. The winch system according to claim 1 wherein said first magnitude threshold is greater than said second magnitude threshold.

4. The winch system according to claim 1 wherein said subsequent interval of operation is preceded by an allowed overload interval subsequent to said initial interval, said control device allowing said motor to draw energy in excess of said second magnitude threshold during said overload interval.

5. The winch system according to claim 1 wherein said combination includes an energy source and said control device detects a third magnitude of energy potential available from said energy source and establishes said first and second magnitude thresholds as a function of said third magnitude.

6. The winch system according to claim 1 wherein said combination detects an interval of non-use of said motor and enters a sleep mode when said interval of non-use exceeds a sleep mode time-out interval.

7. The winch system according to claim 6 wherein said sleep mode includes a reduced energy consumption by said control device.

8. The winch system of claim 1 wherein at least one of said first and second magnitude thresholds are adjusted for maintaining a force threshold applied to the load substantially constant.

9. A winch system comprising:
an electrical energy source for producing an operating voltage;
an electric motor, said electric motor adapted for application to movement of a load when coupled thereto, said electric motor drawing electric current during normal operation, said normal operation comprising a first current threshold for an initial inrush interval of normal operation and a second current threshold for a subsequent interval of normal operation after said initial inrush interval;
a switching network coupling said energy source and said motor to drive said motor in selected rotational directions;
a remote control producing control signals applied to said switching network to selectively drive said motor;
a current sensing device providing a measure of electric current drawn by said motor;
a control device receiving said control signals and said measure of electric current drawn, and including a shut-off device selectively halting operation of said electric motor, said control device activating said shut-off device when said motor draws electric current in excess of said first current threshold during said initial inrush interval or when said motor draws electric current in excess of said second current threshold during said subsequent interval; and
wherein at least one of said first and second current thresholds are adjustable during said normal operation in response to a change in said operating voltage produced by said electrical energy source.

10. A winch according to claim 9 wherein said control device detects a voltage available from said electrical energy source and establishes said first and second current thresholds as a function of said voltage available.

11. A winch according to claim 9 wherein said control device detects an interval of non-use of said motor and enters a sleep mode when said interval of non-use exceeds a sleep mode timeout interval.

12. A winch according to claim 11 wherein said sleep mode includes a reduced energy consumption by said control device.

13. A winch according to claim 9, wherein said switching network is a solenoid network.

14. A winch according to claim 9 wherein said energy source is a battery.

15. A winch according to claim 9 wherein said control signals comprise a power out signal and a power in signal, application of the power in signal to said switching network being dictated by said control device, said power out signal being monitored by said control device.

16. A winch according to claim 9 wherein said subsequent interval is preceded by an allowed overcurrent interval subsequent to said initial interval, said control device allowing said motor to draw current in excess of said second current threshold during said over current interval.

17. A winch according to claim 9, wherein only said second current threshold is adjustable during said normal operation.

18. The winch system of claim 9 wherein at least one of said first and second current thresholds are adjusted during said normal operation for maintaining a force threshold to the load substantially constant.

19. A winch system comprising:
an electrical energy source;
an electric motor, said electric motor adapted for application to movement of a load when coupled thereto, said electric motor drawing electric current during normal operation, said normal operation comprising said electric motor drawing a first magnitude electric current during an initial inrush interval of normal operation and a second magnitude of current during a subsequent interval of normal operation after said initial inrush interval;
a switching network coupling said energy source and said motor to drive said motor in selected rotational directions;
a remote control producing control signals applied to said switching network to selectively drive said motor;
a current sensing device providing a measure of electric current drawn by said motor;
a control device receiving said control signals and said measure of electric current drawn, and including a shut-off device selectively halting operation of said electric motor, said control device activating said shut-off device when said motor draws electric current in excess of said first magnitude during said initial inrush interval or when said motor draws electric current in excess of said second magnitude during said subsequent interval;
wherein said control device adjusts at least one of said first and second magnitudes as a function of a change in an operating condition of said winch system; and
wherein said electric motor includes a spool rotated thereby and carrying a length of cable thereon, said cable being coupled to said load, and wherein said motor produces a layer output representing a number of layers of said cable wrapped around said spool, said layer output being applied to said control device, said control device adjusting at least one of said first and second magnitudes as a function of said layer output.

20. A winch according to claim 19 wherein said control device adjusts said at least one of said first and second magnitudes upward in response to said layer output indicating a greater number of layers of said cable on said spool.

21. A winch according to claim 19 wherein said control device adjusts said at least one of said first and second magnitudes downward in response to said layer output indicating a lesser number of layers of said cable on said spool.

22. A winch system comprising:

an electric DC motor couplable to an electrical energy source and adapted to move a load when coupled thereto, said electric motor drawing a first magnitude electric current during an initial inrush interval and a second, lower magnitude of current during a subsequent interval after said initial inrush interval is complete;

a remote control producing control signals to selectively drive said motor;

a current sensing device providing a measure of electric current drawn by said motor;

a control device receiving said control signals and said measure of electric current drawn, and including a shut-off device selectively halting operation of said electric motor, said control device activating said shut-off device when said motor draws electric current in excess of said first magnitude during said initial inrush interval or when said motor draws electric current in excess of said second magnitude during said subsequent interval;

wherein said electric motor includes a spool rotated thereby and carrying a length of cable thereon and wherein said motor produces a layer output representing a number of layers of said cable wrapped around said spool, said layer output being applied to said control device, said control device adjusting said first and second magnitudes as a function of changes in said layer output and said electrical energy source.

\* \* \* \* \*

UNITED STATES PATENT AND TRADEMARK OFFICE
CERTIFICATE OF CORRECTION

PATENT NO. : 5,648,887
DATED : July 15, 1997
INVENTOR(S) : Herndon et al.

It is certified that error appears in the above-identified patent and that said Letters Patent is hereby corrected as shown below:

Column 6, line 50, "12" should be --$I_2$--.

Column 6, line 55, "12 magnitude" should be --$I_2$ magnitude--, and "current 12" should be --current $I_2$--.

Column 6, line 59, "12" should be --$I_2$--.

Column 7, line 10, "current 12 exceeded" should be --current $I_2$ exceeded--;

Column 9, line 14, "current 12" should be --current $I_2$--;

Column 9, line 22, "current 12" should be --current $I_2$--;

Column 9, line 61, "current 12" should be --current $I_2$--;

Column 10, line 1, "current 12" should be --current $I_2$--;

Column 10, line 11, "current 12" should be --current $I_2$--;

Column 10, line 31, "current 12" should be --current $I_2$--;

Column 10, line 45, "current 12" should be --current $I_2$--;

Column 11, line 1, "current 12" should be --current $I_2$--.

Signed and Sealed this

Thirtieth Day of June, 1998

Attest:

BRUCE LEHMAN

*Attesting Officer*  *Commissioner of Patents and Trademarks*